United States Patent [19]

Lunde

[11] 4,273,469
[45] Jun. 16, 1981

[54] SYSTEM AND METHOD FOR LAYING SUBSEA PIPELINES

[75] Inventor: Peter A. Lunde, Houston, Tex.

[73] Assignee: Santa Fe International Corporation, Orange, Calif.

[21] Appl. No.: 19,609

[22] Filed: Mar. 12, 1979

[51] Int. Cl.³ .................... B21D 3/02; E21B 43/013; F16L 1/04
[52] U.S. Cl. ................................ 405/158; 405/168; 137/355.27
[58] Field of Search ............... 405/158, 168, 171, 164, 405/165, 173; 137/355.12, 355.16, 355.26, 355.27; 166/344, 345, 346, 347, 362

[56] References Cited

U.S. PATENT DOCUMENTS

| | | | |
|---|---|---|---|
| 1,971,165 | 8/1934 | Parker | 137/355.26 |
| 2,490,353 | 12/1949 | Hannay | 137/355.27 |
| 3,512,367 | 5/1970 | McLallen, Jr. | 405/171 |
| 3,872,680 | 3/1975 | Nicholson et al. | 405/168 |
| 3,934,647 | 1/1976 | Bokenkamp | 405/168 X |
| 4,157,023 | 6/1979 | Tisdale et al. | 405/168 X |

*Primary Examiner*—Stephen J. Novosad
*Attorney, Agent, or Firm*—LeBlanc, Nolan, Shur & Nies

[57] ABSTRACT

A system for laying subsea pipelines. The pipeline to be laid is wound on a reel which is rotatably mounted on a support structure. Both the support structure and the reel with the wound pipeline are submergible to a seabed. Both members are intended to be expendable in that once they are submerged and mounted on the seabed, they are not subsequently salvaged. After the support structure with the accompanying reel have been secured to the seabed, the pipeline is drawn off of the reel from its fixed location towards the desired termination point for the pipeline.

15 Claims, 4 Drawing Figures

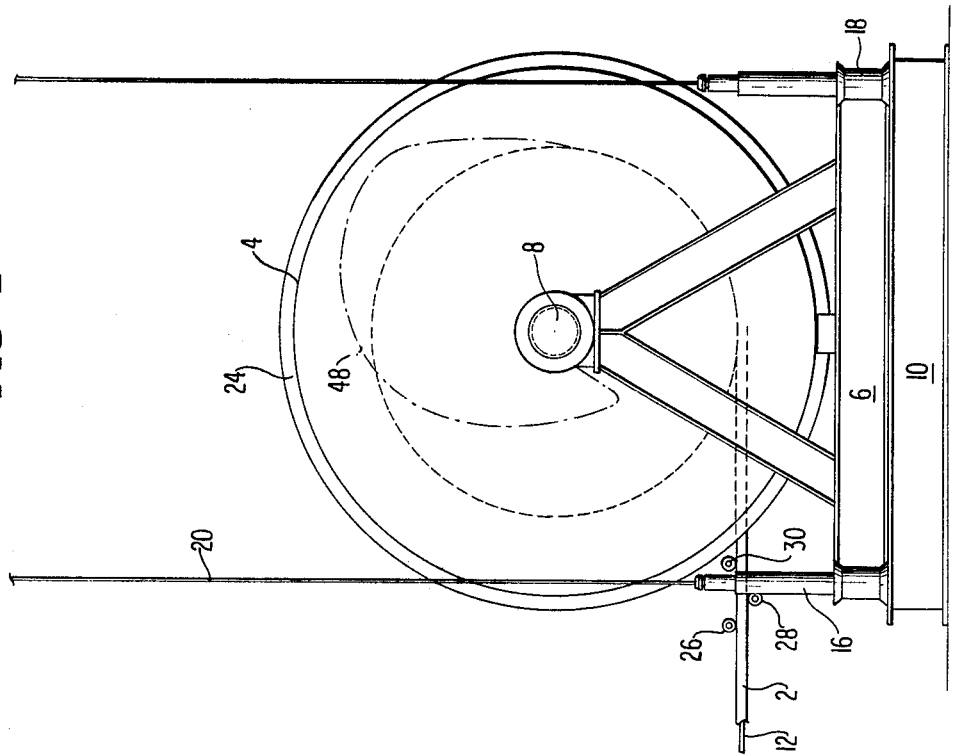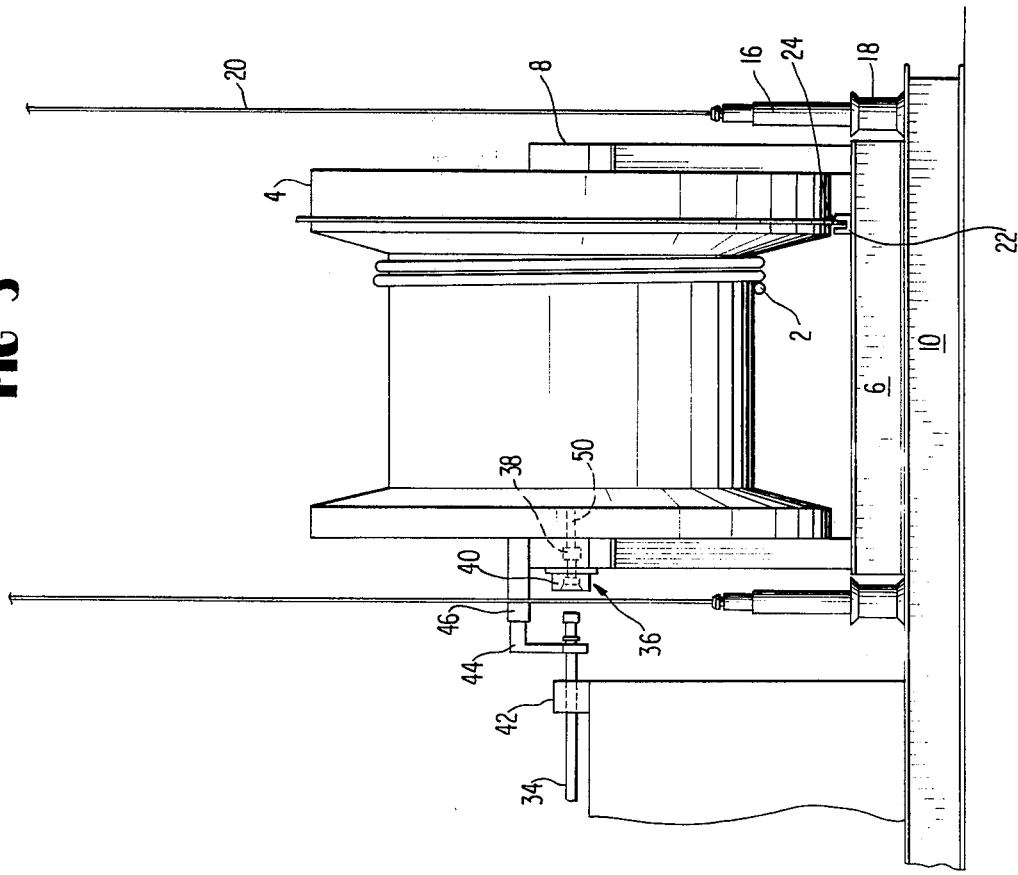

SYSTEM AND METHOD FOR LAYING SUBSEA PIPELINES

BACKGROUND OF THE INVENTION

The present invention relates to a system for laying subsea pipelines and a method by which such system can be laid.

In particular, the present invention is primarily concerned with laying pipelines that are relatively small, e.g., up to approximately six inches in inner diameter, and relatively short, e.g., up to approximately two miles. The system of the present invention is intended for use in laying pipelines in either shallow or deep water.

A factor that must be considered in laying pipelines from a vessel moving along the water is the necessity for maintaining a proper catenary to the pipeline between the water surface and the seabed. Care must be taken to avoid stressing the pipeline excessively otherwise buckling, also known as kinking, of the pipeline will occur as it is paid off the vessel into the water. One way to minimize possible buckling problems especially in deep-water laying operations is to use a pipe-handling mechanism that allows for a variable angle of entry; see, for example, U.S. Pat. No. 3,982,402 to Lange. Alternatively, a stinger appended to the stern of the vessel can be utilized to support the pipe in the water; see, for example, U.S. Pat. No. 3,685,305 to Lloyd. Maintenance of a proper catenary is obtained by controlling both the tension on the pipe and the angle of inclination that the pipe forms with the seabed as it is laid. Significant research has been done to avoid or at least minimize the impact of such problems. This research has led to the development of relatively complex systems that also involve extremely complicated operations.

While a plurality of systems have been developed to resolve such problems, those developments generally involve complex systems for avoiding overstressing of the pipeline as a line is being paid out from the vessel on the water surface. Such systems are concerned with maintaining proper tension on a pipeline and controlling the angle of inclination of the pipeline as it is being fed out. While this problem is primarily one experienced in deep-water laying of pipelines, the same type of problem also occurs in laying pipelines in relatively shallow water although the problem may not be as severe.

While the majority of the developments for avoiding the above noted problems have been involved with the provision of complex mechanisms for controlling the feeding of the pipeline from the water surface, one other system is known which takes a different approach for solving the same type of problem. In this system, the pipeline is wound of a reel which is supported by some type of structure that enables the reel to be pulled along the seabed. The free end of the pipeline is then attached to the wellhead and the reel is then pulled by a seagoing vessel towards the termination point. While in theory, this type of system avoids the previously discussed problems, other problems of a similar nature are encountered. Since the reel is relatively heavy it is difficult to control the speed at which it is pulled towards the termination point by the vessel on the surface. If the reel is pulled too rapidly, excessive stress is applied to the pipeline which can result in damage to the line. In addition, any jogging of the reel as it is moved along the seabed due to either a change in the contour of the bed or the motion of the towing vessel can result in kinks being formed in the pipeline. Consequently, the same type of damage that can be incurred in laying pipeline from the water surface also can result with the use of this type of system.

SUMMARY OF THE INVENTION

An object of the present invention is to provide a system for laying pipeline along a seabed that avoids the problems encountered in utilizing previously known systems.

Another object of the present invention is to provide a system for laying pipeline along a seabed that easily and readily avoids possible damage to the pipeline as it is being laid without requiring the utilization of complex equipment.

A further object of the present invention is to provide a relatively inexpensive system for laying pipeline along a seabed that helps to eliminate damage to the pipeline, such as kinking the line as it is laid along the seabed.

Still another object of the present invention is to provide a procedure for laying pipeline along a seabed that can be employed easily and readily and simultaneously avoids the problems incurred in utilizing previously known procedures.

A still further object of the present invention is to provide a submergible reel and supporting structure that can be employed in a system for laying pipeline along a seabed that achieves the above stated objectives.

These objectives are achieved in accordance with the present invention by providing a system in which a reel containing pipeline wound thereon is submerged to the location from which the connection is to be made and secured to such location while the pipeline is drawn off of the reel towards the termination point. In general, the location at which the reel is submerged and secured in adjacent to the wellhead.

In employing the system of the present invention, the quantity of pipeline wound on the reel depends upon the distance between the two points to be interconnected. A sufficient quantity of pipeline must be provided for interconnecting the wellhead to the termination location; on the other hand, care should be taken to insure that there is not an excessive amount of pipeline on the reel since that would merely result in unnecessary added weight to the structure and added cost for unneeded pipeline. The reel on which the pipeline is wound is rotatably mounted on a support structure. After the pipeline has been wound on the reel which is mounted on the support structure, both the support structure and the reel are submerged to the seabed adjacent to the wellhead. The reel support structure is secured on top of a base structure that is connected to the wellhead. After the reel support structure has been so secured, the pipeline is drawn off from the reel towards the desired termination point at which the free end of the pipeline is connected to an appropriate system at such termination point.

In order to facilitate the connection of the end of the pipeline retained on the reel to the wellhead, the retained end of the pipeline is routed through the center of the reel to a connector mechanism provided on one of the lateral end faces of the reel. The connector mechanism on the reel is positioned along the axis of rotation of the reel and hence the retained end of the pipeline rotates concentrically with the reel thereby eliminating any difficulties with the connection due to any changes in the position of the end of the pipeline to be connected.

Once the reel and the corresponding support structure has been secured to the base of the seabed, the end of the pipeline is drawn off the reel towards the termination point. This procedure can be accomplished relatively simply by connecting a cable to the end of the pipeline, which cable is connected to a take-up reel at the termination point. Thus merely winding the cable on to the take-up reel will pull the pipeline towards the termination point.

As the pipeline is being drawn off the reel, it is desirable to prevent any slippage of the reel in either a forward or reverse direction. If the reel slips in a forward direction thereby unwinding additional pipeline and causing a slack in such pipeline, such a slack can lead to a kinking or buckling of the pipeline. While slippage of the reel in the reverse direction is not a serious problem, such action could create undue stress on the pipeline and potentially damage the pipeline.

Once the end of the pipeline reaches the termination point, the pipeline can be connected either to another subsea structure, or a riser, or fed through a J-tube from the seabed up to the water surface.

After the pipeline has been installed, it is possible to salvage all or part of the reel and its support structure. In general, however, since the costs of salvaging efforts are extremely expensive, and would further add to the complexity of the system and increase the possibility for damage to the pipeline, in accordance with the preferred embodiment of the present invention, the reel and its support structure are both constructed so as to be expendable, i.e. they are left in place on the seabed. Although the reels and support structures are not salvaged, this approach is still more functional and economical once all factors are taken into consideration.

Within the scope of the present invention, it is possible to utilize the system for simultaneously laying two or more pipelines. In such a situation, the multiple pipelines would be simultaneously wound around a single reel and the ends of each of the pipelines routed through the reel and connected at the lateral face of the reel using multiple line connectors. Since the lines could not be located exactly on the center axis of the reel, with such a system it would be necessary to employ a mechanism for controlling the rotational movement of the reel so as to insure that the connectors are appropriately aligned with the lines to which they are to be connected at the wellhead.

In accordance with the present invention, it is anticipated that the reels would be manufactured with preinstalled, pre-tested pipes of a sufficient length for a given job. Each of the reels along with the wound pipe then would be purchased as a unit and installed in the manner described above. The installation procedure employing the system of the present invention is fast, efficient, economical and presents an extremely low risk of damage to the pipeline. In addition, the system and the procedure of the present invention can be utilized for laying pipelines at any depth and thus is extremely advantageous especially when installing relatively small pipelines for relatively short distances.

BRIEF DESCRIPTION OF THE DRAWINGS

FIG. 2 is a side elevational view of the system illustrated in FIG. 1.

FIG. 3 is a front elevational view of the reel and support structure according to the present invention as illustrated in FIG. 1.

DESCRIPTION OF THE PREFERRED EMBODIMENTS

Figure 1:
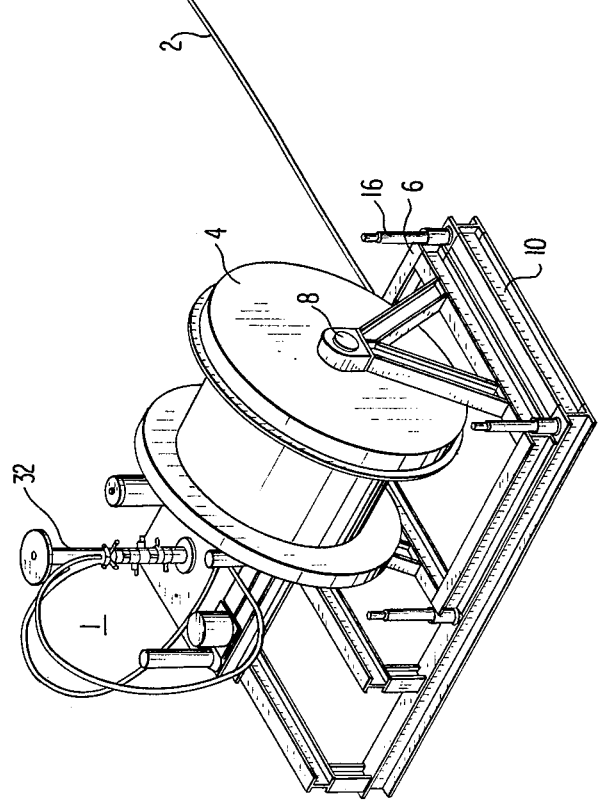
FIG. 1 is a perspective view of a system for laying subsea pipelines in accordance with the present invention.

As shown in FIG. 1, a pipeline 2 extends from a subsea wellhead 1 to an installation platform 3. Pipeline 2 is initially wound on a reel 4, such as partially shown in FIG. 3. Reel 4, in turn, is rotatably mounted on bearing members 8 that are secured on support structure 6. Bearing members 8 are spaced at a sufficient height above the base of support structure 6 so as to provide sufficient room for reel 4 to freely rotate.

Normally, reel 4 is mounted on support structure 6 at the manufacturing plant so that the parts are bought as an assembled unit. Alternatively, the reel can be mounted on the support structure at any other time prior to submersion, such as on a vessel at the location site. In either situation, however, both reel 4 and support structure 6 are lowered to the location of the wellhead as an integral unit.

As shown in FIG. 1, support 6 along with reel 4 are mounted and secured on base structure 10. Support structure 6 can be lowered for mounting on base structure 10 from a vessel at the water surface. For this purpose, there are a plurality of guide wires 20 extending upwardly from mounting post 16 that are attached to base structure 10. At each of the four corners of support structure 6 is a guide member 18. Each of the guide wires 20 pass through a corresponding one of the guide members 18. Support structure 6 along with reel 4 is then lowered from the water surface down to base structure 10. As support structure 6 approaches base structure 10, guide members 18 slide over corresponding mounting post 16. Once guide members 18 and support structure 6 are slid over mounting post 16, the support structure is effectively secured in place on base structutre 10. If desired, additional mechanisms can be used for further securing support structure 6 on base structure 10.

After reel 4 and support structure 6 are mounted on base 10, pipeline 2 is drawn off from the reel towards the desired termination point. As shown in FIG. 1, pipeline 2 extends from wellhead 1 to an installation platform 3. When pipeline 2 reaches installation platform 3, it passes through a J-tube 14 the bottom portion of which is arranged at the seabed. The pipe then passes up through the J-tube to an upper portion of platform 3 at the water surface.

Turning now to FIG. 2, as pipeline 2 is drawn off of reel 4 the pipeline passes through a series of rollers, 26, 28 and 30 that are mounted on support structure 6. For the sake of simplicity in the drawings, the actual mounting mechanisms for these rollers has not been illustrated. Rollers 26, 28 and 30 serve to straighten the pipeline as it passes through the rollers.

In order to prevent any slippage of the reel either in a forward or reverse direction, a retardation mechanism is provided. This retardation mechanism is formed by a friction creating mechanism 22 that creates friction against a drag disk 24 mounted around the outer surface of one end of reel 4. The amount of friction created by mechanism 22 against drag disk 24 can be varied by supplying mechanism 22 with an adjustable pin that can move into either tighter contact or looser contact with disk 24. By varying the friction applied to disk 24, the disk and in turn reel 4 can be prevented from slipping. In addition, by varying the friction applied to disk 24, the force needed to draw pipeline 2 off of reel 4 can be varied and hence the speed of movement of pipeline 2 controlled.

In order to facilitate the connection between the end of pipeline 2 retained on reel 4 and the wellhead, an end 50 of the pipeline is routed through the center of the reel to a centrally positioned coupler 36. As can be seen from FIGS. 2 and 3, the end of pipeline 2 retained on reel 4 passes in a vertical path 48 with end portion 50 being secured to a connector 38 that forms part of coupler 36. Connector 38 in turn is connected to a freely rotating connector 40. Connector 38 is secured to the lateral end face of reel 4. Since connector 38 and end portion 50 of pipeline 2 are aligned along the rotational axis of reel 4, these elements rotate concentrically with the reel thereby avoiding any geometrical problems in interconnecting the pipeline with the wellhead.

After pipeline 2 has been drawn off of reel 4 and connected at the termination point, end portion 50 and coupler 36 are connected to subsea connection 32 for the wellhead. This connection is made through a flowline 34 which is coupled to wellhead connector 32. Flowline 34 passes through a guide 42 mounted on the support for wellhead connector 32. Since flowline coupler 36 is located along the center axis of reel 4, flowline 34 and coupler 36 automatically should be in alignment. In order to further insure such alighment, however, it is possible to provide an alignment arm 44 on flowline 34. A corresponding receiver 46 for alignment arm 44 can be mounted on reel 4. Arm 44 and receiver 46 can be constructed in such a manner so as to allow for some relative adjustment of the position of flowline 34 and coupler 36 so as to insure their alignment. The interconnection between arm 44 and receiver 46 also serves to prevent further relative movement between reel 4 and the wellhead. Once flowline 34 is aligned with coupler 36, the end of the flowline is inserted into the coupler and secured to the coupler so as to complete the connection.

While within the scope of the present invention, a plurality of different systems can be utilized for pulling pipeline 2 off of reel 4 and towards the desired termination point. One specific system will be disclosed herein. An extremely simple mechanism for this purpose includes a cable 12 and a take-up reel for the cable located at the termination point. Cable 12 is connected to the free end of pipeline 2. After cable 12 has been connected to pipeline 2, the cable is then wound up by the take-up reel thereby drawing pipeline 2 off of reel 4 at the location of the wellhead towards the termination point.

Figure 4:
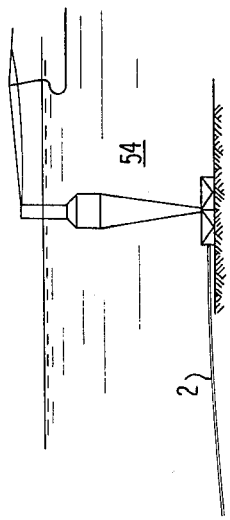
FIG. 4 is a perspective view of an alternative subsea termination structure that can be employed with the system of the present invention.

While in FIG. 1 an installation platform with a J-tube is illustrated, other structures can be used at the termination point. One such other possibility is a subsea base installation 54 such as illustrated in FIG. 4. When utilizing such a subsea base installation, the pipeline is directly connected to a mechanism located on the seabed instead of being pulled up to the surface of the water. The system for laying the pipeline and the operation of such system, however, is the same.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A system for laying subsea pipelines, said system comprising: a reel; a pipeline wound on said reel; support means for rotatably supporting said reel, said support means and said reel with said wound pipeline being submergible to a seabed; securing means including a base structure capable of being secured on the seabed and means for attaching said support means to said base structure; and means for drawing said pipeline off of said reel from the location of said support means towards a desired termination location.

2. A system according to claim 1 wherein said reel has an opening extending along its rotational axis.

3. A system as defined in claim 2 wherein an end of said pipeline to be retained on said reel is routed through said opening in said reel to a lateral face of said reel so that said end of said pipeline rotates concentrically with said reel.

4. A system according to claim 1 further comprising: a pair of rollers rotatably mounted on said support means with a sufficient spacing between said rollers for enabling said pipeline to be drawn between said rollers but in contact therewith so that said rollers serve to straighten said pipeline as it is withdrawn from said reel.

5. A system according to claim 1 further comprising means for controlling the rate at which said pipeline can be drawn off of said reel.

6. A system according to claim 1 further comprising means for preventing said reel from slipping as said pipeline is drawn off of said reel.

7. A system according to claim 1 wherein said means for drawing said pipeline off of said reel includes a pulling line capable of being connected to the end of said pipeline drawn off of said reel and extending to an intended termination location for said pipeline.

8. A system for use in laying subsea pipelines, said system comprising: a reel capable of supporting a pipeline wound thereon; and support means for rotatably supporting said reel, said reel and said support means being submergible to a seabed, and said support means including means for enabling said support means to be secured at a fixed location on such seabed, so that after said support means is so secured, a pipeline wound on said reel can be drawn off from said reel.

9. A system according to claim 8 wherein said reel has an opening extending along its rotational axis.

10. A system according to claim 9 further comprising: a plurality of rollers rotatably mounted on said support means with a sufficient spacing between said rollers for enabling a pipeline wound on said reel to be drawn between said rollers but in contact therewith so that said rollers serve to straighten such pipeline as it is withdrawn from said reel.

11. A system according to claim 10 further comprising means for controlling the rate at which such pipeline can be drawn off of said reel.

12. A system according to claim 10 further comprising means for preventing said reel from slipping as such pipeline is drawn off of said reel.

13. A method for installing subsea pipelines comprising the steps of: winding the pipeline to be installed onto a reel; mounting the reel on a support member in such a manner that the reel is rotatable on the support member; submerging the support member and the reel to a seabed; securing the support member to the seabed; drawing the pipeline off of the reel from the location of the support member towards a desired termination location; and connecting the free end of the pipeline at the termination point.

14. A method according to claim 13 further comprising the step of straightening the pipeline as it is drawn off of the reel.

15. A method according to claim 14 further comprising the step of controlling the rotational movement of the reel as the pipeline is drawn off so as to prevent the reel from slipping.

* * * * *